United States Patent

[11] 3,620,824

| [72] | Inventors | Philip E. Slade<br>Pensacola, Fla.;<br>Robert T. Estes, Cary; James C. Randall,<br>Durham, N.C. |
|---|---|---|
| [21] | Appl. No. | 733,831 |
| [22] | Filed | June 3, 1968 |
| [45] | Patented | Nov. 16, 1971 |
| [73] | Assignee | Monsanto Company<br>St. Louis, Mo. |

[54] WHITE THERMALLY STABLE POLYETHER MODIFIED POLYESTER FIBERS AND METHOD OF PRODUCTION
6 Claims, No Drawings

[52] U.S. Cl. .................................................. 117/138.8 F,
117/139.4, 117/139.5 R, 252/404, 260/45.8 N,
260/45.95
[51] Int. Cl. ........................................................ B44d 1/46,
B32b 27/36
[50] Field of Search ............................................ 252/404;
117/138.8 F; 260/45.8, 45.95

[56] References Cited
UNITED STATES PATENTS

| 2,676,122 | 4/1954 | McCarthy .................... | 117/139.50 |
|---|---|---|---|
| 2,693,430 | 11/1954 | Cross et al. .................... | 117/139.50 |
| 2,699,410 | 1/1955 | Emblem ........................ | 117/139.50 |
| 2,967,774 | 1/1961 | Bell et al. ...................... | 260/45.95 |
| 2,985,617 | 5/1961 | Salyer et al. ................... | 260/45.9 |
| 3,362,930 | 1/1968 | Kehe ............................. | 260/45.8N |
| 3,388,169 | 6/1968 | Tyre et al. ..................... | 252/404 |

*Primary Examiner*—William D. Martin
*Assistant Examiner*—Ralph Husack
*Attorneys*—Thomas Y. Awalt, Jr. and Robert L. Broad, Jr.

ABSTRACT: The thermal stability in the presence of oxygen of polyether-modified polyethylene terephthalate fibers in increased by applying thereto at least about 150 parts per million based on the weight of the fiber of a mixture consisting essentially of 1. from about 65 to 85 percent based on the weight of the mixture of a hindered bis-phenol selected from the group consisting of 4, 4'-butylidenebis (6-t-butyl-m-cresol) and 2, 2'-butylidenebis (6-t-butyl-m-cresol), and
2. from about 35 to 15 percent based on the weight of the mixture of a polymer of 2,2, 4-trimethyldihydroquinoline having a number average molecular weight of from about 450 to 700.

WHITE THERMALLY STABLE POLYETHER MODIFIED POLYESTER FIBERS AND METHOD OF PRODUCTION

BACKGROUND OF THE INVENTION

The simplest form of polymer containing ester linkages is the polyester and it is well known that linear polyesters can be made by heating together a dihydric alcohol or its functional derivatives and a dibasic carboxylic acid or a polyester-forming derivative thereof, such as an acid halide, a salt, or a simple ester of a dibasic acid and a volatile monohydric alcohol. As heating is continued, particularly in vacuum or in a current of an inert gas, condensation continues linearly with formation of longer and longer chains. When these polyesters are in a highly polymerized condition, they can be formed into filaments, fibers, and the like, which can be permanently oriented by cold drawing. That is, when the esterification reaction is carried out for a sufficiently prolonged period under conditions such as to remove the water of reaction effectively, linear polyesters may be produced having extremely high molecular weights, which, in the case of polyesters capable of crystallizing at ordinary temperature, may possess the property of cold drawability. The noncrystalline polyesters of high molecular weight are viscous liquids at ordinary temperatures whereas the crystalline polyesters are hard, tough microcrystalline substances which melt at a definite crystalline melting point to form viscous liquids.

The most widely known and most important commercially of the highly polymeric polyesters are those prepared by the condensation of terephthalic acid or dimethyl terephthalate and a polymethylene glycol containing from 2 to 10 carbon atoms, and particularly ethylene glycol. These polymers or polyesters are relatively insoluble, chemically inactive, hydrophobic materials capable of being formed into filaments which can be cold drawn to produce textile fibers of superior strength and pliability. However, these materials are not readily permeable to water and accordingly they cannot be satisfactorily dyed by the ordinary dyeing procedures used in dyeing cotton, wool, natural silk and regenerated cellulose.

It is known that various chain-terminating agents, for example, methoxypolyethylene glycol, may be polymerized with a glycol and a dicarboxylic acid, such as terephthalic acid to produce a fiber-forming polyester having increased dye affinity. By incorporating a small amount of a chain branching agent or cross-linking agent in the polyester reaction mixture, along with a chain-terminating agent, a polyester can be produced which not only possesses the desired dye affinity but also, has the necessary molecular weight. That is, the chain-branching agent allows the introduction into the polyester molecule of the necessary amount of the chain-terminator without the reduction in molecular weight which is encountered when like amounts of chain-terminator are employed in the polyester reaction mixture without the chain-branching agent.

Unfortunately, these modified polymers do not have the thermo-oxidative stability possessed by the unmodified polyethylene terephthalates. Most chain-terminators, including the alkoxypolyethylene glycols, are subject to oxidation at elevated temperatures, initiating degradation of the polymer.

Many of the processes through which polyester fibers are customarily passed, involve temperatures which are high enough to initiate this degradation in the presence of oxygen. This is particularly true of the new durable press process, an area in which the use of polyester and polyester-cotton blends is rapidly expanding.

Briefly outlined, the conditions employed in the usual commercial processing of polyester fibers in fabric preparation are as follows:

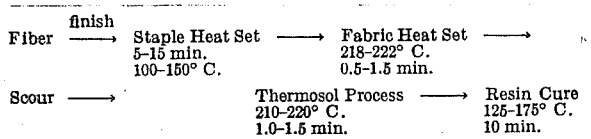

Of the well-known commercial antioxidants, many are highly colored and when added to the polymer in sufficient quantity to prevent degradation, impart an undesirable color to the fiber. Other antioxidants which are not highly colored do not function adequately with this composition.

SUMMARY OF THE INVENTION

It has been found that the whiteness of the fiber can be retained while stabilizing against thermo-oxidative degradation by applying to the fiber a proper combination of an alkylated hindered bis-phenol such as 4, 4'-butylidenebis (6-t-butyl-m-cresol) with a polymer of 2,2, 4-trimethyl-dihydroquinoline having a number average molecular weight of from about 450–700. At an effective level the latter component alone discolors the fibers, and the bisphenol alone is not an effective stabilizer at reasonable concentrations.

It is an object of this invention to produce dyeable polyester fibers of the polyether-modified type of a high degree of thermostability and without the undesirable discoloration imparted by many commercial antioxidants.

It is a secondary object of this invention to produce a heat stabilizer for polyester fibers.

Other objects of the invention will become apparent from the description hereinafter.

These stabilizing compositions are most effectively applied to the fibers along with the finish. After the fibers have been heat treated, the additives are retained in the fibers even upon scouring.

DESCRIPTION OF THE PREFERRED EMBODIMENT

Details of a preferred method of preparing such polyether-modified polyethylene terephthalate fibers and examples of suitable chain terminators and chain-branching or cross-linking agents are to be found in U.S. Pat. No. 2,895,946 and more particularly from line 16 column 3 to line 17 column 6 thereof. The term "polyether-modified polyethylene terephthalate fibers," as used herein, includes all fibers spun from polyesters modified with chain terminating agents substantially as described. The term "fibers," as used herein, includes filaments, fabrics and textile articles.

The stabilizer composition of this invention is preferably applied to the fibers by applying to the fibers an aqueous emulsion of the mixture containing about 10 percent solids, the solids content comprising any desirable textile finish and including at least about 30 percent of the weight of the solids of a mixture consisting essentially of from about 65 to 85 percent of a hindered bis-phenol selected from the group consisting of 4, 4' -butylidenebis (6-t-butyl-m-cresol) and 2, 2' -butylidenebis (6-t-butyl-m-cresol); and from about 35 to 15 percent of a polymer of 2, 4-trimethyl dihydroquinoline) having a molecular weight of from about 450–700. The 4, 4' -butylidenebis is sold commercially as "Santowhite Powder." The quinoline polymer is sold commercially as Flectol H (molecular weight about 600) and as Age Rite resin D (molecular weight about 500). Any conventional finish application method may be used, and the amount of additive deposited on the fibers which is necessary to prevent fusion of the fibers at 200° C. for up to about 8 minutes is at least about 150 parts per million based on the weight of the fiber. The 500 p.p.m. minimum application on the fiber is applicable to those mixtures wherein the quinoline polymer weight percentage in the mixture is at about 35 percent, the high point of the preferred range. As the concentration of the quinoline polymer decreases to a minimum of about 15 percent of the mixture, the minimum weight deposit on the fiber required for such a degree of thermal-stability increases to about 250 parts per million based on the weight of the fiber.

After the emulsion is applied, the fibers are heat-set at from about 100 to 150° C. for a period of from about 5 to 15 min. Effectiveness of additives has been determined by Differential Thermal Analysis, Thermogravimetric analysis, fusion temperature, and olfactory detection of the low molecular weight aldehydes which are oxidative decomposition products of the polyethers. Specific test procedures employed were: 1. Differential Thermal Analysis (DTA) of the fiber in air.

Temperature was increased at a rate of 20° C. minute. The temperature at which the exotherm began was used as an indication of initial decomposition temperature.

2. Aluminum cup test at 200° C.

Approximately 5 grams of carded staple fiber was placed in a large aluminum cup into which several holes were punched to assure air flow through the sample. The sample was placed in a circulating air oven maintained at 200° C. and the elapsed time before aldehyde odor was first detected was noted. This temperature corresponded to the temperature at which the samples fused. If no odor was noted after 10 minutes, the sample was removed.

3. Aluminum cup test at 230° C.

This test was run in the same manner as test 2 except that the temperature was 230° C., and the sample was allowed to remain in the oven 5 minutes if no aldehyde odor was noted sooner.

4. Thermogravimetric analysis (TGA)

Samples were tested at 175° C. for 20 min. and at 200° C. for 10 min. Since polyethylene terephthalate which contained no modifier had no weight loss, it was assumed that the weight loss of the modified fibers was due primarily to decomposition of the polyether. Thus, the smaller the weight loss, the more stable the fiber. The efficiency of stabilization was expressed as a percentage, comparing the difference in weight loss of the stabilized and unstabilized fibers to the weight loss of the unstabilized fibers. Thus, no weight loss in the stabilized sample represented 100 percent efficiency. The following examples illustrate the practice of this invention, but are not intended to limit it.

EXAMPLE 1

Filaments were formed by melt extrusion of a polyethylene terephthalate polymer modified with approximately 6 percent, based on the weight of the polyethylene terephthalate, of methoxy polyethylene glycol having a molecular weight of about 2000 and approximately 0.125 percent, based on the weight of the polyethylene terephthalate, of pentaerythritol. The filaments were drawn at a draw ratio of 4.8 to a denier per filament of 1.5. These filaments were then treated with a typical antistat and lubricating finish; an aqueous emulsion containing 10 percent solids, the solids content of which comprised about 70 percent by weight of the monostearate of polyethylene glycol (M. W. 400), and 30 percent of soya dimethylaminoethylammonium ethosulfate. The latter component is described in U.S. Pat. No. 3,329,758. After application of this finish, the filaments were heat-set at 145° C. for 9 minutes and scoured with a mixture of nonionic surfactant (Triton X-100, Rohm and Haas) and tetrasodium pyrophosphate, dried at 80° C. and tested for thermo-oxidative stability. The fibers of this example served as controls in evaluating test results.

EXAMPLE 2

Polyester fibers were prepared and treated as in example 1 except that a polymer of 2, 2, 4 trimethyldihydroquinoline (average molecular weight 500) was added to the emulsion in an amount which constituted 33 percent by weight of the total solids. Various amounts of the polymer additive were deposited on the fibers by varying the total solids concentration in the emulsion. The treated and scoured fibers were tested for thermo-oxidative stability by Differential Thermal Analysis (DTA) in air. Results are shown in table I (examples 2a–2d).

EXAMPLE 3

Fibers were prepared and treated as in example 1 except that 4, 4'-butylidenebis (6-t-butyl-m-cresol) was added to the emulsion in an amount which constituted 33 percent by weight of the total solids. Various amounts of the antioxidant were deposited in the fibers by varying the total solids concentration in the emulsion. After heat-setting and scouring, the fibers were tested for thermo-oxidative stability by DTA under the same conditions as the fibers of example 2. Results are shown in table I (examples 3a and 3b).

EXAMPLE 4

Polyester fibers were prepared and treated as in example 1 except that various mixtures of the trimethyldihydroquinoline polymer used in example 2 and 4, 4'-butylidenebis (6-t-butyl-m-cresol) were added to the emulsion in an amount constituting 33 percent of the total solids. After heat-setting, scouring and drying, the fibers were subjected to Differential Thermal Analysis under the same conditions as the fibers of example 2. These fibers were also subjected to the Aluminum Cup Test at 200° C. (Test No. 2) Results of both tests are recorded in table II.

EXAMPLE 5

Effect of Addition of Antioxidants to the Polymer Before Spinning

To 250 g. of a low molecular weight polyethylene terephthalate (prepolymer) were added 14.4 grams of methoxy polyethylene glycol and 0.24 g. of 4, 4'-butylidenebis (6-t-butyl-m-cresol) and 0.24 g. of potassium 3,5-dicarboxybenzenesulfonate. The mixture was stirred (240 r.p.m. at 276° C. and atmospheric pressure for 12 minutes. A vacuum was then applied and heating was continued at 280° 1 hour and 40 minutes while the pressure was reduced to 0.4 mm. Hg. Fibers were prepared from this polymer and subjected to DTA (Test 1). Results are shown in table IV.

EXAMPLE 6

One gram of the dihydroquinoline polymer in 5 ml. of ethylene glycol was added to 200 g. of freshly prepared polyethylene terephthalate containing 6 percent methoxy polyethylene glycol. The mixture was heated at atmospheric pressure and 280° C. for 10 minutes. Heating was then continued under reduced pressure (Ca. 1 mm.) for 40 minutes. The polymer was spun into fibers which were subjected to Differential Thermal Analysis. Results are shown in table IV.

While polyesters modified with polyethers terminated with higher alkyl or phenyl groups are considerably more stable to thermo-oxidation than are those modified with methoxy polyethylene glycol, their stability can be further enhanced, and their retention of whiteness upon exposure to heat can be improved by incorporation of the additives of this invention.

The following examples illustrate these improvements.

EXAMPLE 7

Filaments were formed by melt extrusion of a polyethylene terephthalate polymer modified with approximately 1 mole percent based on the weight of the polyethylene terephthalate of nonyl phenoxy polyethylene glycol (MW approximately 800) and 1000 p.p.m. of pentaerythritol. The filaments were then drawn and treated in the same manner as the fibers in example 1. These fibers served as a control.

EXAMPLE 8

Filaments were prepared and treated as in example 7 except that the dihydroquinoline polymer was added to the emulsion in an amount which constituted 33 percent by weight of the total solids. By adjustment of the concentration of the emulsion, 226 p.p.m. of the antioxidant were deposited in the fibers. They were then subjected to the Fusion test at 230° C. for 5 minutes and their whiteness after heating was measured with a spectrophotometer substantially in accordance with the test method described in the American Dyestuff Reporter Vol. 54, No. 10, 1965, pp. 33–38, in a report by W. A. Coppock entitled "Chemstrand Whiteness Scale." This test is well known in the art. Results are shown in table V.

EXAMPLE 9

Fibers were prepared and treated as in example 7 except that the bisphenol was substituted for 33 percent of the solids content of the emulsion. By adjusting the concentration of the emulsion, 192 p.p.m. of the antioxidant were deposited on the fibers. They were subjected to the Fusion test at 230° C., and their whiteness was measured after heating. Results are given in table V.

EXAMPLE 10

Fibers were prepared and treated as in example 7 except that a mixture of 70 parts of the bisphenol and 30 parts of the dihydroquinoline polymer was substituted for 33 percent of the solids content of the emulsion. By adjusting the concentration of the emulsion 224 p.p.m. of the antioxidant combination were deposited on the fibers. They were then subjected to the Fusion test at 230° C., and their whiteness after heating was measured. Results are shown in table V.

In addition to the tests above referred to as shown in tables I, II, IV and V, examples 2c, 3c, and 4d were evaluated for stability by thermogravimetric analysis (TGA) as described above. Results are reflected at table III.

TABLE I

| Ex. No.: | Antioxidant | Conc. (p.p.m.) | Exotherm temp. (° C.) |
|---|---|---|---|
| 1 | Control | 0 | 165 |
| 2a | Dihydroquinoline polymer | 417 | (¹) |
| 2b | do | 358 | (¹) |
| 2c | do | 212 | (¹) |
| 2d | do | 97 | 217 |
| 3a | Bis-phenol | 283 | 220 |
| 3b | do | 424 | 220 |

¹ No exotherm before melt.

TABLE II

| Sample Number | Conc. (p.p.m.) bis-phenol | Antioxidant, dihydroquinoline polymer | Ratio bis-phenol/ dihydroquinoline polymer | Test #1, exotherm temp. (° C.) | Test #2, min. to fusion at 200° C. |
|---|---|---|---|---|---|
| 4a | 184 | 20 | 90/10 | 197 | 5 |
| 4b | 149 | 37 | 80/20 | None | 7 |
| 4n | 245 | 61 | 80/20 | None | 8 |
| 4d | 136 | 58 | 70/30 | None | (¹) |
| 4e | 60 | 60 | 50/50 | 208 | 8 |

¹ No fusion at 10 min.

TABLE III.—EVALUATION BY THERMOGRAVIMETRIC ANALYSIS (TEST 3)

| Example | Composition | Percent wt. loss 175° C. | Efficiency (20 min.) | Percent wt. loss 200° C. | Efficiency (10 min.) |
|---|---|---|---|---|---|
| | Polyethylene terephthalate | 0 | | 0 | |
| 1 | Control | 3.6 | | 4.16 | |
| 2c | Control plus 212 p.p.m. dihydroquinoline polymer | 1.5 | 58.2 | 0 | 100 |
| 3c | Control plus 200 p.p.m. bis-phenol | 2.85 | 20.8 | 3.4 | 18.3 |
| 4d | 194 p.p.m. 70/30 bis-phenol/dihydroquinoline polymer | 0.56 | 86.1 | 0.97 | 75.5 |

TABLE IV

| Example No. | Antioxidant | Conc. (p.p.m.) | Exotherm temp (° C.) |
|---|---|---|---|
| 1 | Control | 0 | 165 |
| 5 | Bis-phenol | 1,000 | 162 |
| 6 | Dihydroquinoline polymer | 5,000 | 160 |

TABLE V

| Example | Additive | Conc. (p.p.m.) | 230° C. 5 min. | Whiteness |
|---|---|---|---|---|
| 7 | Control | 0 | Fused | |
| 8 | Dihydroquinoline polymer | 226 | No fusion | 69 |
| 9 | Bis-phenol | 192 | Fused | |
| 10 | 70/30 bis-phenol dihydroquinoline polymer | 224 | No fusion | 77 |

We claim:

1. The method of imparting thermal stability in the presence of oxygen without imparting color to polyether-modified polyethylene terephthalate fibers comprising
   a. applying to the fibers at least 150 parts per million based on the weight of the fiber of a mixture consisting essentially of
      1. from about 65 percent to 85 percent based on the weight of the mixture of a hindered bis-phenol selected from the group consisting 4, 4'-butylidenebis (6-t-butyl-m-cresol) and 2,2'-butylidenebis (6-t-butyl-m-cresol), and
      2. from about 35 percent to 15 percent based on the weight of the mixture of a polymer of 2, 2, 4-trimethyl-dihydroquinoline having a number average molecular weight of from about 450 to 700; and then
   b. heat-setting said fibers.

2. The method of claim 1 wherein said hindered bis-phenol is 4, 4'-butylidenebis (6-t-butyl-m-cresol).

3. The method of claim 1 wherein said polyethylene terephthalate fibers are modified with nonyl phenoxypolyethylene glycol and pentaerythritol.

4. The method of claim 1 wherein said polyethylene terephthalate fibers are modified with methoxy polyethylene glycol and pentaerythritol.

5. The method of claim 1 wherein the amount of said mixture deposited on said fibers is about 200 parts per million based on the weight of said fiber, and the ratio of said hindered bis-phenol to said trimethyl-dihydroquinoline polymer in said mixture is about 70/30.

6. Polyether-modified polyethylene terephthalate fibers treated in accordance with the method of claim 1.